May 19, 1964   R. E. GOODMAN ETAL   3,133,753
BUCKLE SECURED CLAMP FOR JOINING ABUTTING CONDUITS
Filed Oct. 18, 1960   5 Sheets-Sheet 1
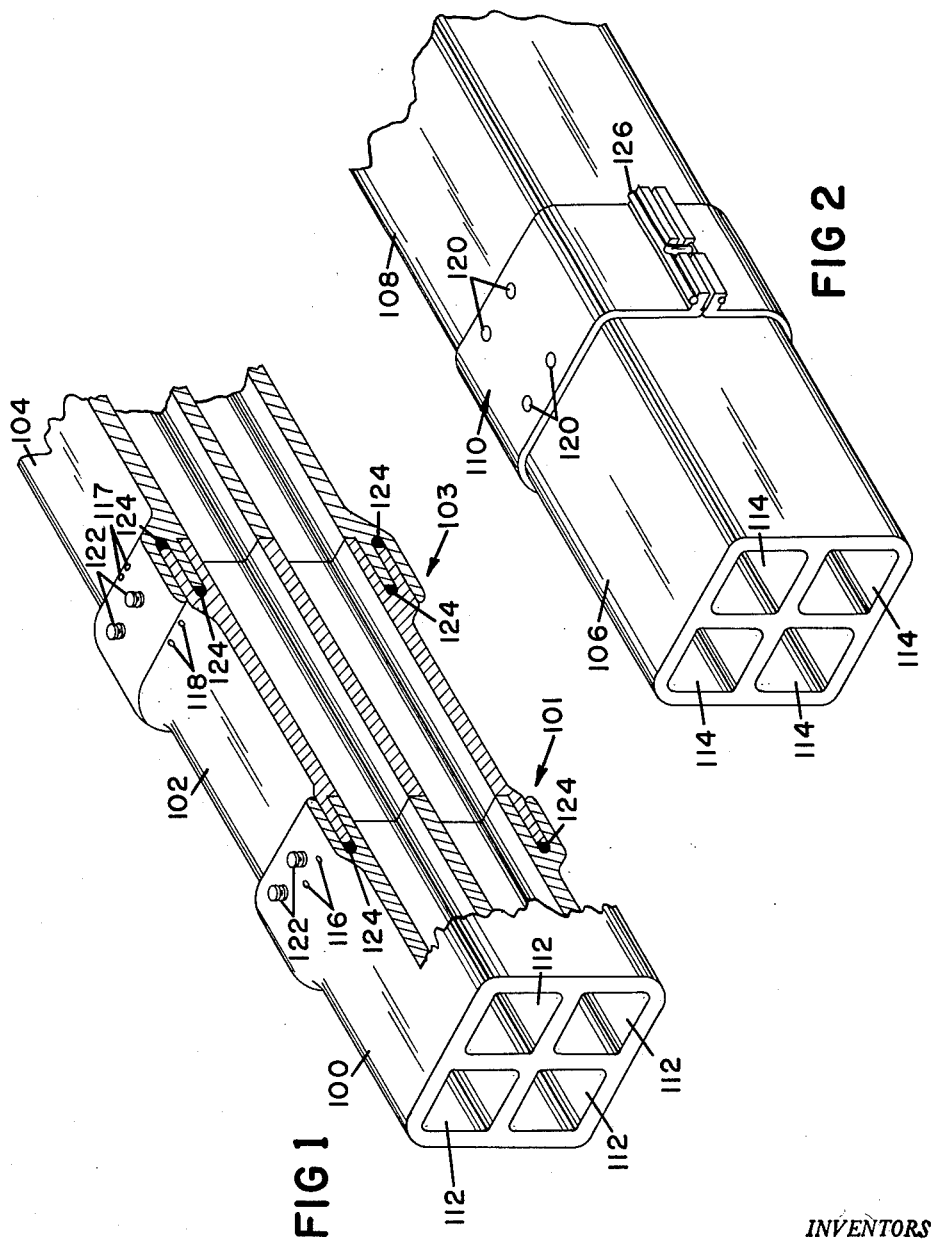
INVENTORS
ROYAL E. GOODMAN
HANS P. ODIN
BY Walter G. Finch
ATTORNEY May 19, 1964 R. E. GOODMAN ETAL 3,133,753
BUCKLE SECURED CLAMP FOR JOINING ABUTTING CONDUITS
Filed Oct. 18, 1960 5 Sheets-Sheet 2

*INVENTORS*
ROYAL E. GOODMAN
HANS P. ODIN
BY Walter G. Finch
ATTORNEY

May 19, 1964  R. E. GOODMAN ETAL  3,133,753
BUCKLE SECURED CLAMP FOR JOINING ABUTTING CONDUITS
Filed Oct. 18, 1960  5 Sheets-Sheet 3
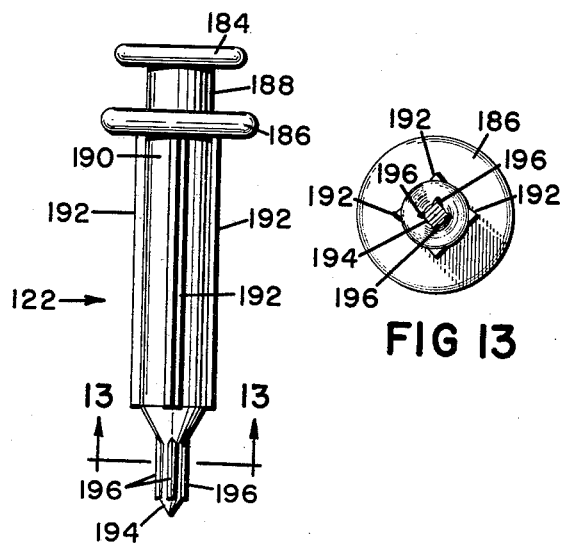
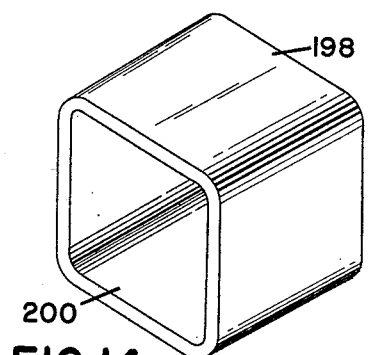
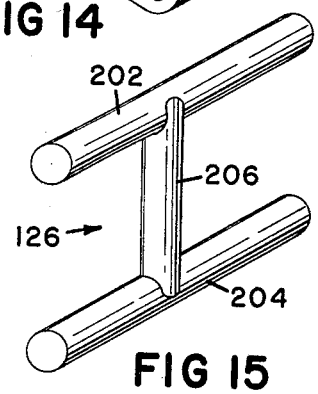
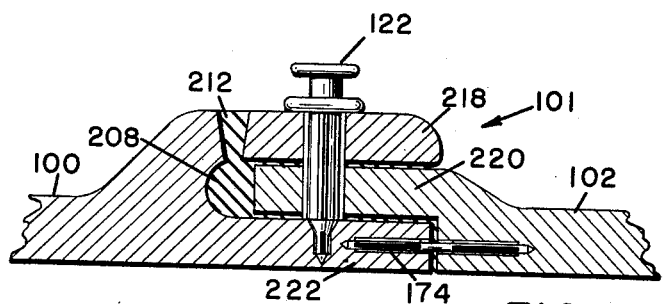
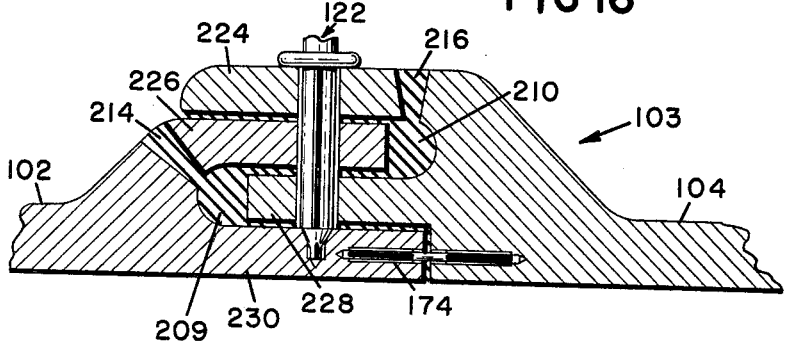
INVENTORS
ROYAL E. GOODMAN
HANS P. ODIN
BY
Walter G. Finch
ATTORNEY

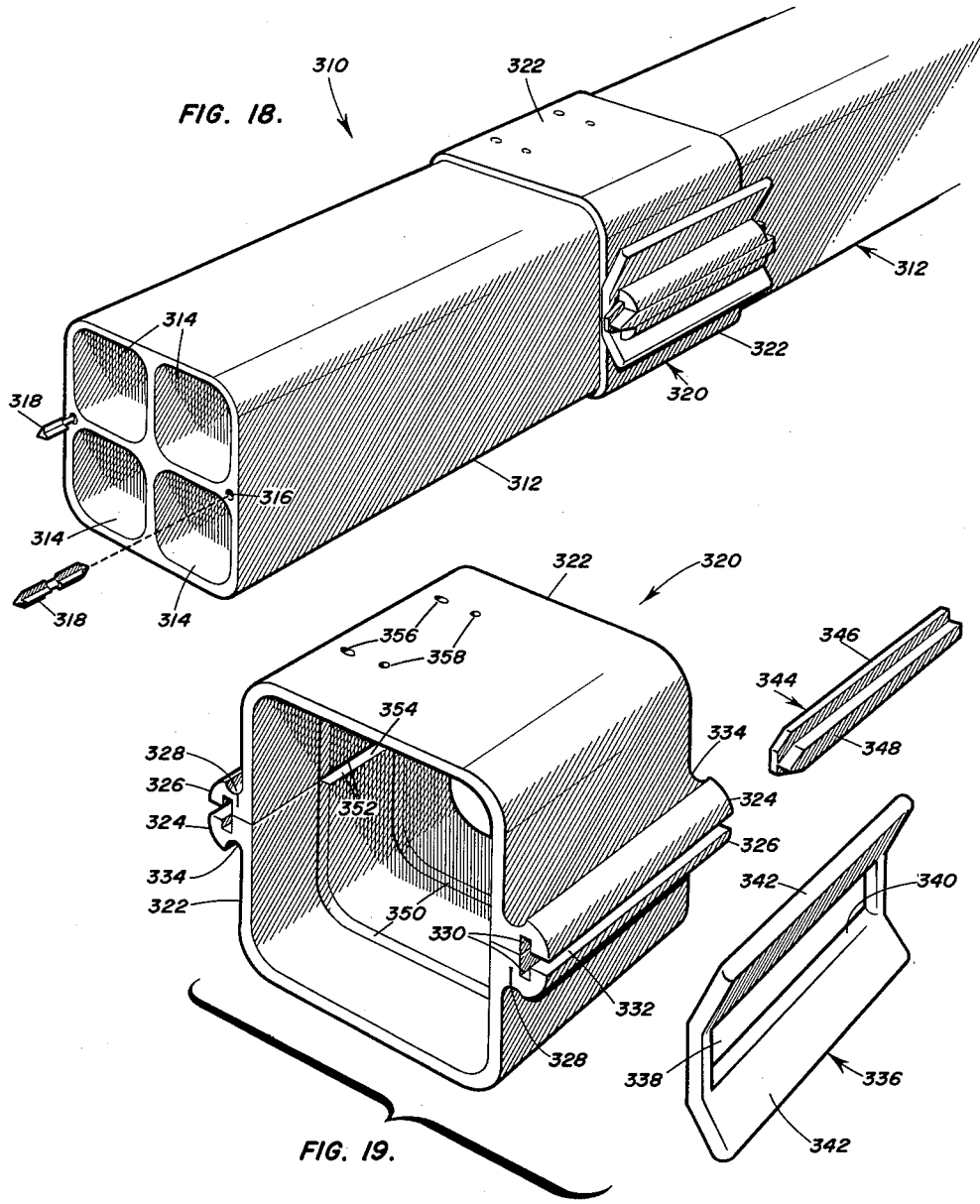

May 19, 1964  R. E. GOODMAN ETAL  3,133,753
BUCKLE SECURED CLAMP FOR JOINING ABUTTING CONDUITS
Filed Oct. 18, 1960  5 Sheets-Sheet 5

ROYAL E. GOODMAN
HANS P. ODIN
INVENTORS

BY Walter G. Finch
ATTORNEY

United States Patent Office 3,133,753
Patented May 19, 1964

3,133,753
BUCKLE SECURED CLAMP FOR JOINING
ABUTTING CONDUITS
Royal E. Goodman, 1711 Goodview Road, and Hans P. Odin, 7801 Beverly Road, both of Baltimore, Md.
Filed Oct. 18, 1960, Ser. No. 63,446
2 Claims. (Cl. 285—91)

This invention relates generally to pipe couplings, and more particularly the invention relates to improved joint reinforcement and sealing arrangements for conduits. This patent application is a continuation-in-part of U.S. patent application Serial Number 753,546, filed August 6, 1958, for "Method and Arrangement for Joining and Sealing Conduits."

In underground transmission line for electric power and communication as well as fluid transport as in sewer, water and drainage, it is customary to lay segments pipe or single or multiple duct directly or indirectly in the earth. In any case, the support afforded by the earth is often unreliable due to heaving and cavitation. The result is that one or more segments of the conduit are displaced or left unsupported with consequent opening of the joint. This is especially true for the newer light-weight conduit using fibrous material.

A displaced joint is the source of many troubles. In addition to the displaced joint allowing the entrance of water and dirt, the discontinuity is an obstruction to the passage of additional electrical cables by the "fishing" method. In this operation, a drain line is passed through a chamber of the conduit by a "ferret" or "rabbit" consisting of a cone shaped probe driven by air pressure applied against it from one terminal of the conduit. Any conduit leaks prevent the building up of sufficient pressure to complete the operation.

Additionally, ground water entering the conduit by even a single leak is channeled by the conduit passages into the terminal man holes usually provided to rapidly fill them unless drains and pumps are provided. To avoid such costly nuisances, it can be seen that a positively sealed, mechanically secure joint is of utmost importance.

It is, therefore, the primary object of this invention to provide a joining arrangement or means for linking and aligning conduit sections together which can easily be installed or removed.

Another object of this invention is to provide a readily attached joint-sealing arrangement for a conduit in which the sections thereof are mechanically linked and aligned together with the joint-sealing arrangements.

Still another object of this invention is to provide a pin secured and aligned gasketed pipe joint.

Yet another object of this invention is to provide a closed, fluid impermeable tube structure system.

Another object of this invention is to provide a split type replacement section for a conduit.

These and other objects and advantages of this invention will become more readily apparent and understood from the accompanying specification and drawings in which:

FIG. 1 is a perspective view, partly in section, illustrating both the single strength and the double strength conduit lock joints comprising this invention;

FIG. 2 shows in perspective view the application of one type of sealing gasket for conduit joints of this invention;

FIG. 12 is an enlarged side elevation of a headed securing pin for the improved conduit joints;

FIG. 13 is a cross section of the headed securing pin of FIG. 12 taken along line 13—13 thereof;

FIG. 14 is a perspective view of an elastic or shrinkable band gasket for conduit joints and especially for replacement conduit segments of the type illustrated in FIG. 11;

FIG. 15 shows in enlarged perspective view a securing pin for conduit gaskets of the split type;

FIG. 16 is a vertical cross-section partly in elevation, of an alternate pin secured single strength conduit joint;

FIG. 17 is a vertical cross-section, partly in elevation, of a double strength conduit joint with an alternate pin securing arrangement;

FIG. 18 is a perspective view of multiple conduits incorporating a novel coupling device incorporating features of this invention;

FIG. 19 is an enlarged exploded perspective of the novel coupling of FIG. 18.

Figure 3:
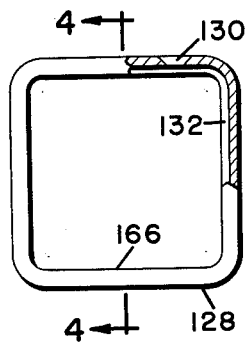
FIG. 3 is an end view, partly broken away, of a conduit joint sealing gasket.

Referring now to the drawings, and particularly FIGS. 1 and 2 thereof, a conduit of the type under discussion is provided in circular or rectangular cross-section. The conduit is pierced by one or more longitudinal passages 112 or 114 as shown in FIGS. 1 and 2, respectively, and it is provided in convenient lengths or segments 100, 102, 104, 106, and 108. For best results, the material is a light plastic or plastic-like material with or without aggregate and suitable for receiving dowel pins, alignment pins, and securing or fastening pins of a type to be described hereinafter. The material chosen should also be somewhat frangible to allow access by fracture if desirable.

In FIG. 1, there are shown two types of joints 101 and 103 according to principles of this invention. Single lock joint 101 is best seen in FIG. 16 where there are shown a pair of annular mortise flanges 218 and 222 formed on the end of segment 100. On the left end of segment 102 there is formed a tenon 220 dimensioned to mate with mortise flanges 218 and 222 when segments 100 and 102 are placed end to end.

Double lock joint 103 shown in detail in FIG. 17 is of extra strength construction, and it has annular mortise flanges 224 and 228 which mate with mortise flanges 226 and 230 when segments 104 and 102 are in abutment. For the conduit to withstand pressure at great depths, the joint 103 is to be preferred.

Spaces 208, 209 and 210 remaining at the ends of segments 100, 102, and 104, of FIGS. 16 and 17, are provided with fill gates 212, 214, and 216, respectively. Holes 116, 117, and 118, shown in FIG. 1, communicate with these gates through which a sealing compound 124 is forced.

Where great mechanical strength, is required, as in vertical runs or for suspensions, joints 101 and 103 may be locked by means of a pin 122.

In the preferred form of the invention as shown in FIG. 12, pin 122 has a cylindrical body 190, a shoulder 186, and a reduced pointed cylindrical body 194. Flutes 192 and 196 are provided to grip the sides of holes into which the pin 122 is driven. For convenience of removal of the pin 122, an extended portion 188 with a head 184 is added thereto.

Figure 7:
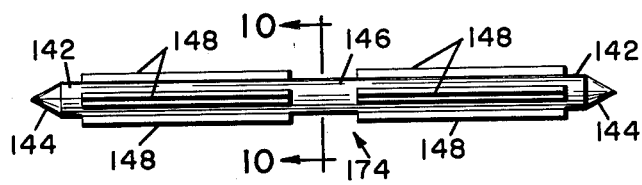
FIG. 7 is a greatly enlarged view of an anchor pin for the improved conduit joint.

Anchor pins 174 are also shown in FIGS. 16 and 17. As detailed in FIG. 7, pins have a cylindrical body with pointed ends 144. Flutes 148 cover most of the cylindrical surface of the body except for an area 146 which provides gripping space for a withdrawal tool.

Figure 11:
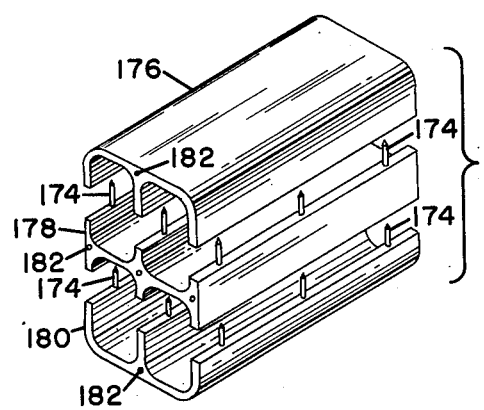
FIG. 11 is an exploded perspective view of a replacement conduit segment.

Pins 174 are specially useful in the assembly of replacement conduit segments illustrated in FIG. 11. Here the conduit is longitudinally split into three sections 176, 178, and 180 so that they can be nested about existing cables (not shown) and then secured together by the pins 174. Holes or apertures 182 are provided to match with other holes or apertures in adjacent sections wherein additional pins 174 may be used.

Figure 8:
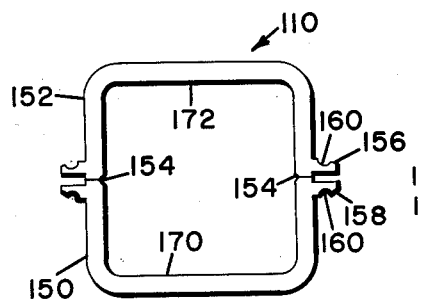
FIG. 8 is an end view of a double split type of sealing gasket.

The replacement conduit depicted in FIG. 11 requires a seal placed over its entire length and extending onto adjacent conduit sections 186 and 108 as shown in FIG. 2. Seal band 110 may be split into two halves 150 and 152 as shown in FIG. 8, or may be a wrap-around band 140 as shown in FIG. 5.

The most simple seal band is illustrated in FIG. 14, and it consists of a band of semi-elastic material 198 which is forced on and around the existing conduit ends prior to the installation of the replacement conduit of FIG. 11. It may be desirable to use a cement or solvent on the inner surface 200 to assure a waterproof, airtight joint when the band 198 is finally moved over the replacement conduit.

Figure 4:
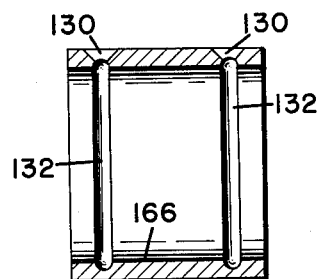
FIG. 4 is a cross section taken along line 4—4 of FIG. 3.

FIGS. 3 and 4 show another simple form of seal band consisting of a continuous band of material 128 whose inside perimeter 166 corresponds to that of the conduit. Circumferential grooves 132 near the ends of the seal band are provided with sealing compound filling gates 130.

Figure 5:
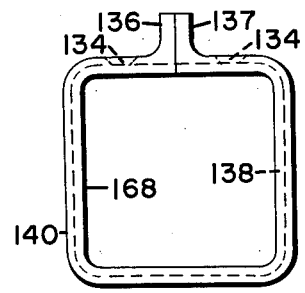
FIG. 5 is an end view of an alternate sealing gasket of the weld type for the improved conduit joint.
Figure 6:
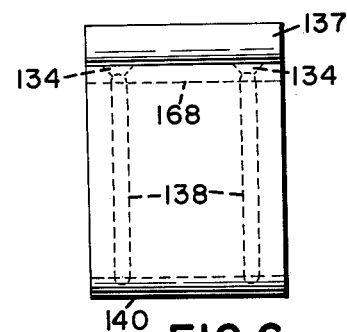
FIG. 6 is a side elevation of the sealing gasket of FIG. 5.

In FIGS. 5 and 6, the band 140 is provided with ears 136 and 137 which may be cemented or sealed together when the inside surface 168 is made to conform with the conduit. Sealing compound grooves 138 and gates 134 are similarly provided.

Figure 9:
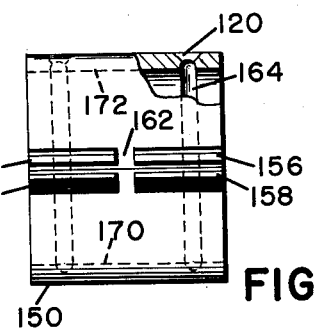
FIG. 9 is a side elevation of the gasket shown in FIG. 8.
Figure 10:
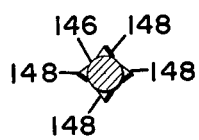
FIG. 10 is a cross-section of the anchor pin of FIG. 7 taken along line 10—10 thereof.

As illustrated in FIGS. 8 and 9, band 110 may be provided with special ears 156 and 158 having grooves 160 and an interrupted area 162 for a securing pin 126 shown in place in FIG. 2.

In the detail view of FIG. 15, pin 126 is H-shaped having side rods 202 and 204 and a vertical cross piece 206. Cross piece 206 fits into the interrupted area 162, while side rods 202 and 204 clip into grooves 160 to effectively close the gaps 154 and draw the inner surfaces 170 and 172 into contact with the enclosed conduit.

Sealing compound grooves 164 with filling gates 120 may be provided if desired. It can be seen that the seal band of FIGS. 8 and 9 is readily demonstrable and may be used where repeated access to the conduit is desirable. In all cases, however a pressure-tight seal is obtained.

It is to be pointed out that the conduits which have been used in the past have been of a clay, pipe or tile construction. Such construction of conduits has not been too satisfactory or have not proven suitable because of their great weight. Also, such conduits do not have a good joint. Such prior art conduits usually use a bell joint that is used with a sealing compound. In the past, this has not proven satisfactory in the prior art tile and concrete conduits as mentioned above.

Referring now to FIGS. 18 and 19, of the drawings, there is shown a novel waterproof, airtight, lightweight multiple conduit 310. The conduit 310, as illustrated in FIGS. 18 and 19, is of lightweight construction and has dowel ends which will hold the conduit sections 312 tightly together. This conduit consists of conduit sections 213 joined together by a novel coupling 320 which will be explained in detail subsequently.

Each conduit section 312 consists of a plurality of longitudinally extending passageways 314, as best illustrated in FIG. 18, separated by partitions molded to the respective section. In addition, each conduit section 312 is provided with a plurality of alignment holes or apertures 316 for receiving alignment dowel pins 318. These dowel pins 318 are inserted in the apertures 316 between adjacent conduit sections 312 and as previously described.

As illustrated generally in FIG. 18 and as shown in detail in FIG. 19, the coupling 320 consists of a pair of substantially identical coupling halves 322. Each coupling half 322 is provided with a pair of diametrically opposite and extending flanges 324 and 326, with each flange 324 and 326 having a longitudinally extending groove 330 therein extending from one side to the opposite side thereof.

When the coupling halves 322 are assembled as illustrated in FIG. 19, the flanges 324 and 326 are spaced from each other lengthwise, and together with their respective grooves 330 and the intervening space therebetween form a T-shaped groove 332. The coupling halves 322 are fitted together so well that a knife cut is positioned between the coupling halves 322. In addition to the above, each flange 324 and 326 is formed with a round bottom groove 334, whose purpose will be described subsequently.

In order to couple or lock the two coupling halves 322 together in order to hold the coupling 320 in position about the adjacent conduit sections 312, a latch buckle 336, having a longitudinally extending slot 338, is provided, on each side of the conduit 310. The latch buckle 336 is provided with lever plates or arms 342 on opposite sides of the slot 338 for ease of assembly of the buckle 336 to the coupling halves 332. The slot 338 is provided with rounded sides 340 in order that the latch buckle 336 can be quickly and smoothly assembled over the flanges 324 and 326, as best illustrated in FIG. 18.

After the latch buckle 336 is assembled in position on the flanges 324 and 326, a key 344 having a base 346 and a web 348 can be optimally inserted in the aligned grooves in the T-shaped groove 332 which, as previously pointed out, is formed of the grooves 330 of the flanges 324 and 326 and the space between the mating faces of the flanges 324 and 326 to lock the halves 322 together and provide a double locking feature. If desired, the key 344 can be omitted. However, it, with the latch buckle 336, does form a double lock.

The coupling 320 provides a double protection in that would be inserted through the apertures 356 and 358 it can be used with or without a sealing compound which into the grooves 350 which extend around the interior periphery of the coupling 320 and the longitudinal grooves 352 and 354 for the coupling halves 322, as shown best in FIG. 19.

In the event it is found necessary to use the sealing compound in connection with the coupling device 320, this can be done when a fluid condition under the ground is encountered that requires a tight seal. By double protection, it is meant that the coupling 320 can be used as it is without a sealing compound to provide a speedier assembly of the conduit sections 312 and the coupling 322.

However, if a soil condition is encountered which is muddy or a water condition is encountered, then the sealing compound can be pumped through the apertures 356 and 358 into the grooves 350, 352, and 354, so as to provide a double seal of the conduit sections 312 to the coupling sections 322.

It is to be further pointed out that when the conduit sections 312 and coupling 322 are placed under the ground, it is necessary as a general rule to keep out only the dirt and stones. Therefore, the sealing compound is not necessary. However, it is only when a water condition or soil condition, or both, are encountered that the sealing compound is necessary. The use of the sealing compound also makes the conduit structure completely water-proof and enables the conduit 310 to be used with compressed air or the like.

Figure 20:
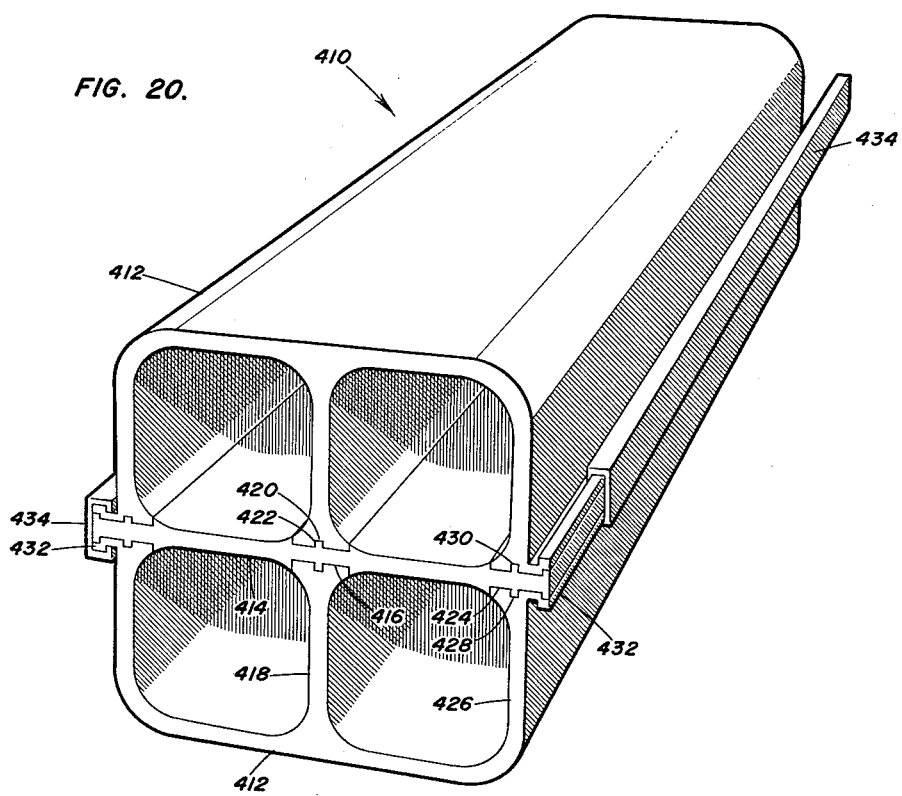
FIG. 20 is a perspective view of another coupling arrangement for a multiple conduit incorporating features of this invention.

Referring now to FIG. 20 of the drawing, there is illustrated a conduit section 410 which can be used to replace conduit sections which have been broken by external sources, such as someone drilling into the conduit or perhaps someone grading on a road. This replacement conduit section 410 coming in parts so that it can be utilized to replace damaged sections of conduits.

This conduit section or repair section 410 consists of a pair of substantially identical conduit halves 412 having a center plate 414. Each section half 412 of the conduit 410 is provided with side leg members 426 and a center leg member 418. The center leg member 418 is provided with a pair of spaced wide central lands 416, having a groove 422 therebetween and corresponding to grooves and a tongue 422, respectively, formed in the center plate 414.

In addition, each side leg 426 is provided with a pair of spaced lands 424 having a groove 428 therein for mating with corresponding grooves and a tongue 430 respectively, provided in the edge of the center plate 414.

The side legs 426 of each coupling section 412 are provided with a T-shaped flange formed by the assembly of the coupling section halves and the center plate 414 for receiving a C-shaped keeper channel 434 which can be utilized for holding the conduit halves 412 and center plate 414 together when the keeper channel 434 is assembled therein.

Obviously many modifications and variations of the present invention are possible in the light of the above teachings. It is, therefore, to be understood that within the scope of the appended claims the invention may be practiced otherwise than as specifically disclosed.

What is claimed is:

1. A coupling device for joining and sealing abutting conduit sections together, comprising a pair of coupling halves arranged to encompass said abutting ends of said conduit sections and to be in substantially abutting contact with each other, each coupling half having diametrically opposite longitudinally extending flanges formed integral therewith, with the flanges in the opposing coupling halves being spaced from each other when said coupling halves are assembled about the abutting ends of said conduits to form pairs of corresponding flanges, the flanges of each pair of corresponding flanges having opposing slots at their respective bases, said slots opening into the spacing between the flanges of each pair thereof, whereby said spacing is in the form of a T-shaped slot, and means for locking each pair of corresponding flanges together, said means consisting of a latch buckle member having a longitudinally extending slot therein for engaging over each pair of corresponding flanges radially inwardly from said T-shaped slot and means for engaging in said T-shaped slot and having a length greater than the length of said T-shaped slot so as to extend over a portion of said latch buckle member thereby blocking removal of said latch buckle member from its respective pair of corresponding flanges.

2. A coupling device for joining and sealing abutting conduit sections together, comprising a pair of coupling halves arranged to encompass said abutting ends of said conduit sections and to be in substantially abutting contact with each other, each coupling half having diametrically opposite longitudinally extending flanges formed integral therewith, with the flanges in the opposing coupling halves being spaced from each other when said coupling halves are assembled about the abutting ends of said conduits to form pairs of corresponding flanges, the flanges of each pair of corresponding flanges having opposing first slots at their respective bases, said first slots opening into the spacing between the flanges of each pair thereof, whereby said spacing is in the form of a T-shaped slot, and second slots on the opposite sides of the flanges of each pair thereof substantially radially inwardly from said first slots therein, and means for locking each pair of corresponding flanges together, said means consisting of a latch buckle member having a longitudinally extending slot therein for engaging over the second slots in the flanges of each pair of corresponding flanges and means for engaging in said T-shaped slot and having a length greater than the length of said T-shaped slot so as to extend over a portion of said latch buckle member thereby preventing removal of said latch buckle member from its respective pair of corresponding flanges.

References Cited in the file of this patent

UNITED STATES PATENTS

| 17,485 | Broad | June 9, 1857 |
| 142,388 | Goble | Sept. 2, 1873 |
| 250,548 | Kitzmiller | Dec. 6, 1881 |
| 261,189 | Walker | July 18, 1882 |
| 269,085 | McLaughlin | Dec. 12, 1882 |
| 352,754 | Hurlbut | Nov. 16, 1886 |
| 712,839 | McGowan | Nov. 4, 1902 |
| 798,196 | Lyle | Aug. 29, 1905 |
| 1,182,872 | Darrow | May 9, 1916 |
| 1,686,468 | Rosenberg | Oct. 2, 1928 |
| 2,424,542 | Adams | July 29, 1947 |
| 2,438,679 | Parker | Mar. 30, 1948 |
| 2,663,325 | Bede | Dec. 22, 1953 |

FOREIGN PATENTS

| 624,074 | Germany | Jan. 11, 1936 |
| 211,708 | Switzerland | Dec. 16, 1940 |